(12) United States Patent
Finger et al.

(10) Patent No.: US 6,254,811 B1
(45) Date of Patent: Jul. 3, 2001

(54) ORGANOPOLYSILOZANE COMPOSITIONS CROSSLINKABLE WITH ELIMINATION OF ALCOHOLS TO GIVE ELASTOMER

(75) Inventors: Christian Finger, Mühldorf; Norman Dorsch, Burghausen; Wolfgang Hechtl, Burghausen; Christian Baumgartner, Burghausen, all of (DE); Alfred Heinrich, Ach (AT)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/452,582

(22) Filed: Dec. 1, 1999

(30) Foreign Application Priority Data

Dec. 2, 1998 (DE) .............................. 198 55 619

(51) Int. Cl.$^7$ .............................. E04B 1/68; C08G 77/18; C08G 77/16
(52) U.S. Cl. ............................... 264/35; 528/34; 528/39; 528/23; 556/458; 556/459; 52/742.16
(58) Field of Search ................................. 528/34, 23, 39; 556/458, 459; 52/742.16; 264/35

(56) References Cited

U.S. PATENT DOCUMENTS

| | | | |
|---|---|---|---|
| 3,151,099 | * | 9/1964 | Ceyzeriat et al. . |
| 4,755,578 | | 7/1988 | Lucas . |

FOREIGN PATENT DOCUMENTS

| | | |
|---|---|---|
| 0 608 888 A1 | 1/1994 | (EP) . |
| 00763 556 A1 | 3/1997 | (EP) . |
| WO 96/27636 | 9/1996 | (WO) . |

OTHER PUBLICATIONS

Derwent Abstract Corresponding To EP 608888 [AN 1994–242259].
Derwemt Abstract Corresponding To WO 96/27636 [AN 1996–425400].
Derwent Abstract corresponding to EP 0 763 556 A1 (AN 1997—167762).

* cited by examiner

Primary Examiner—Robert Dawson
Assistant Examiner—Kuo-Liang Peng
(74) Attorney, Agent, or Firm—Brooks & Kushman P.C.

(57) ABSTRACT

Alkoxy RTV-1 compositions comprise the product of the reaction of
(A) an HO-terminated organopolysiloxane,
(B1) an alkoxysilane which has at least three alkoxy groups and/or its partial hydrolysates, and
(B2) an alkoxysilane which has two alkoxy groups and/or its partial hydrolysates, in the presence of
(C) an acid phosphoric ester of the general formula (I)

$$(HO)_aOP(-O-[(CR^1_2)_b-O]_c[(CR^2_2)_d]_e-L-M)_{(3-a)} \quad (I),$$

where a is 1 or 2,
$R^1$ and $R^2$ are a hydrogen radical, methyl radical or hydroxyl radical,
b and d are 2 or 3,
c is an integer from 2 to 15,
e is 0 or 1
L comprises a radical —O—, —COO—, —OOC—, —CONR$^3$—, —NR$^4$CO— or —CO—,
$R^3$ and $R^4$ are a hydrogen radical or $C_1$–$C_{10}$-alkyl radical, and
M is a monovalent, unsubstituted or hydroxyl-, fluorine-, chlorine-, bromine-, $C_1$–$C_{10}$-alkoxyalkyl- or cyano-substituted $C_1$–$C_{20}$-hydrocarbon radical, with the proviso that on any given carbon atom not more than one radical $R^1$ and $R^2$ may be a hydroxyl radical.

14 Claims, No Drawings

ORGANOPOLYSILOZANE COMPOSITIONS CROSSLINKABLE WITH ELIMINATION OF ALCOHOLS TO GIVE ELASTOMER

TECHNICAL FIELD

The invention relates to alkoxy RTV-1 compositions which give low-modulus vulcanizates, to the preparation of these compositions, and to their use as sealing compounds for filling joints in natural stone.

BACKGROUND ART

Unplasticized RTV-1 (room temperature vulcanizable, one part) compositions have unsatisfactory stress-strain behavior for use as permanently flexible sealing materials, since the stress values at, for example, 100% strain ("modulus at 100% strain") are too high. A high 100% modulus (e.g. 0.6 N/mm$^2$) is associated with a marked increase in stress in the event of widening of the joint, caused for example by changes in temperature, which markedly increases the danger of adhesion failure, i.e. detachment of the flexible sealing material from the respective joint substrate. It has been found in practice, that a 100% modulus of from 0.2 to 0.4 N/mm$^2$ is desirable for this type of joint.

The stress-strain behavior of a silicone rubber vulcanizate is a function of the type and amount of the filler and especially of the number of crosslinking nodes per unit of volume. The modulus of RTV-1 systems can be reduced by increasing the chain length of the hydroxyl-terminated diorganopolysiloxane component. However, the use of very long-chain polymers compromises the consistency of the RTV-1 system. Thus, if the consistency of the filled paste is to be soft and paste-like but also self-supporting, the viscosity of the organopolysiloxane cannot be too high, otherwise the result is a stiff, putty-like paste which is difficult to use.

For this reason, compositions are frequently made using blends of long-chain polymers and low-viscosity silicone plasticizers. This procedure is common practice in order to prepare a low-modulus product, and the use of such plasticizers for reducing viscosity is vital if the material is to be adequately processable. In addition, the use of a trimethylsilyl-terminated, short-chain organopolysiloxane as a plasticizer also reduces the number of crosslinking nodes per unit of volume, and therefore lowers the modulus.

The fundamental disadvantage of a plasticizer is that it is not chemically bound to the vulcanizate network. It can therefore migrate out onto adjacent surfaces and form deposit, either by being dissolved out from the vulcanizate by contact with a solvent, or by spontaneous migration. This phenomenon becomes particularly noticeable with joints in porous natural stone, such as marble, granite or altoquartzite, since the periphery of the joint becomes hydrophobicized and darkens therefore permanently, and this is of course undesirable. Products comprising plasticizers should therefore in principle not be used for filling joints in natural stone.

To avoid the addition of plasticizer in alkoxy RTV-1 compositions, EP-A-763 556 condenses a short-chained OH-terminated organopolysiloxane with catalysis by an acid phosphoric ester, e.g., di-2-ethylhexyl phosphate, forming a long-chained OH-terminated organopolysiloxane. The condensation is terminated by, for example, incorporating chalk after 14 minutes, which evidently brings about neutralization and thus deactivation. This is followed by the alkoxy end-capping of the long-chained OH-terminated organopolysilane with methyltrimethoxysilane, with catalysis by a titanium catalyst. Low-modulus vulcanizates can be prepared in this way. However, this process requires an excessive number of operations and gives unvulcanized compositions which are undesirably stiff.

U.S. Pat. No. 4,755,578 describes an alkoxy RTV-1 composition which comprises a blend of alkyldialkoxysilyl- and trialkoxysilyl-terminated polymers with dialkylmonoalkoxysilyl-terminated polymers. The dialkylmonoalkoxy end groups are not active in crosslinking. The preparation from hydroxyl-terminated diorganopolysiloxane and dialkoxysilanes, and also trialkoxysilanes, takes place over a relatively long period at relatively high temperatures, such as from 60 to 80° C. The incorporation of other constituents into the RTV-1 composition has to take place separately afterward. The disadvantages of such preparation need not be stated.

DISCLOSURE OF INVENTION

An object of the invention is to provide a simple way of manufacturing alkoxy RTV-1 compositions which are easy to use and which, without adding plasticizer, can be adjusted to have a low modulus. For the purposes of the present invention, the term organopolysiloxanes is intended to include dimeric, oligomeric and polymeric siloxanes.

BEST MODE FOR CARRYING OUT THE INVENTION

The invention provides alkoxy RTV-1 compositions comprising the reaction product of (A) an HO-terminated organopolysiloxane, (B1) an alkoxysilane which has at least three alkoxy groups and/or its partial hydrolysates, and (B2) an alkoxysilane which has two alkoxy groups and/or its partial hydrolysates, in the presence of (C) an acid phosphoric ester of the general formula (I)

$$(HO)_aOP(-O-[(CR^1_2)_b-O]_c[(CR^2_2)_d]_e-L-M)_{(3-a)} \quad (I),$$

where a is 1 or 2,

R$^1$ and R$^2$ are a hydrogen radical, methyl radical or hydroxyl radical, b and d are 2 or 3, c is an integer from 2 to 15, e is 0 or 1

L is an —O—, —COO—, —OOC—, —CONR$^3$—, —NR$^4$CO— or —CO— radical,

R$^3$ and R$^4$ are a hydrogen radical or C$_1$–C$_{10}$-alkyl radical, and

M is a monovalent, unsubstituted or hydroxyl-, fluorine-, chlorine-, bromine-, C$_1$–C$_{10}$-alkoxyalkyl- or cyano-substituted C$_1$–C$_{20}$-hydrocarbon radical, with the proviso that on any carbon atom only one radical R$^1$ and R$^2$ may be a hydroxyl radical.

The process proceeds at temperatures as low as room temperature with a high rate of reaction and high selectively, and therefore shortly after mixing components (A), (B1), (B2) and (C), for example after 10 minutes, the alkoxy-terminated organopolysiloxane formed, which is the product of the reaction of component (A) with (B1) and (B2) with elimination of an alkanol, can be used as an alkoxy RTV-1 composition, if desired after admixing with other constituents. No supply of energy, for example heating of the mixture, is required. There is no need to check whether the reaction has run to completion.

Another advantage of this process is that no side-reactions occur and, for example, no formation of T units or Q units is observed on linear HO-terminated organopolysiloxanes (A). The acid phosphoric esters (C) do not have to be deactivated immediately after the reaction.

Using the blends of bifunctional (B2) and tri- and/or tetrafunctional alkoxysilanes (B1), monoalkoxy-, dialkoxy- and trialkoxysilyl end groups are prepared. The monoalkoxysilyl end groups are not active in crosslinking and therefore do not contribute to increasing the node concentration in the network. This achieves a lower modulus without the need to accept the disadvantage of the migration susceptibility of an admixed plasticizer.

The invention also provides a process for preparing the alkoxy RTV-1 compositions, in which (A) an HO-terminated organopolysiloxane, (B1) an alkoxysilane which has at least three alkoxy groups and/or its partial hydrolysates, and (B2) an alkoxysilane which has two alkoxy groups and/or its partial hydrolysates, are reacted in the presence of (C) an acid phosphoric ester of the general formula (I).

The weight ratio of the alkoxysilanes (B1):(B2) is preferably from 99:1 to 0.5:1, in particular from 5:1 to 1:1.

c is preferably an integer from 2 to 10, in particular 2, 3, 4 or 5.

L is preferably an —O— radical.

M is preferably an unsubstituted or $C_1$–$C_{10}$-alkoxyalkyl-substituted $C_1$–$C_{20}$-hydrocarbon radical, in particular an unsubstituted $C_5$–$C_{18}$-hydrocarbon radical.

$R^1$ and $R^2$ are preferably a hydrogen radical.

b and d are preferably 2.

The HO-terminated organopolysiloxanes (A) are preferably linear α,ω-dihydroxypoly(diorganosiloxanes) of the general formula (II)

$$HO\text{—}[R_2SiO]_m\text{—}H \qquad (II),$$

where

R is a monovalent, unsubstituted or fluorine-, chlorine-, bromo-$C_1$–$C_4$-alkoxyalkyl- or cyano-substituted $C_1$–$C_8$-hydrocarbon radical, and m has a value which corresponds to a viscosity of the HO-terminated organopolysiloxane (A) of from 0.05 to 1000 Pa·s.

Examples of hydrocarbon radicals R are linear and cyclic, saturated and unsaturated alkyl radicals such as the methyl radical, aryl radicals such as the phenyl radical, alkaryl radicals such as tolyl radicals, and aralkyl radicals such as the benzyl radical. Preferred radicals R are unsubstituted hydrocarbon radicals having from 1 to 6 carbon atoms, particularly preferably the methyl radical. The organopolysiloxanes (A) preferably have a viscosity of from 100 to 700,000 mPa·s, in particular from 20,000 to 350,000 mPa·s, measured in each case at 23° C.

The alkoxysilanes (B1) preferably have the general formula (III)

$$R^5{}_\mu Si(OR^6)_{4-\mu} \qquad (III),$$

where $R^5$ and $R^6$ are monovalent, unsubstituted or fluorine-, chlorine-, bromine-, $C_1$–$C_4$-alkoxyalkyl- or cyano-substituted $C_1$–$C_{13}$-hydrocarbon radicals, and $\mu$ is 0 or 1.

The partial hydrolysates of alkoxysilane (B1) may be produced by hydrolyzing and condensing from 2 to 4 alkoxysilanes. Examples of partial hydrolysates (B1) are hexamethoxydisiloxane and hexaethoxydisiloxane.

The alkoxysilanes (B2) preferably have the general formula (IV)

$$R^7{}_2Si(OR^8)_2 \qquad (IV),$$

where $R^7$ and $R^8$ are monovalent, unsubstituted or fluorine-, chlorine-, bromine-, $C_1$–$C_4$-alkoxyalkyl- or cyano-substituted $C_1$–$C_{13}$-hydrocarbon radicals. Each of $R^5$ and $R^7$ is preferably an unsubstituted $C_1$–$C_6$-hydrocarbon radical, in particular a methyl, ethyl or propyl radical. Each of $R^6$ and $R^8$ is preferably an unsubstituted $C_1$–$C_6$-hydrocarbon radical, in particular a methyl, ethyl, vinyl or propyl radical.

The acid phosphoric esters (C) of the general formula (I) are storage-stabilizers for the alkoxy RTV-1 compositions prepared from the alkoxy-terminated organopolysiloxane. In particular, the skin formation times of the alkoxy RTV-1 compositions remain virtually constant and stable, and discoloration is suppressed.

In the general formulae (I) to (IV), all of the radicals R and $R^1$ to $R^8$, and all of the indices a, b, c, d, e, m and μ, may be identical or different, independently of one another.

The amounts of the acid phosphoric esters (C) used, based on 500 parts by weight of the HO-terminated organopolysiloxanes (A) are from 0.1 to 50 parts by weight, in particular from 2 to 20 parts by weight.

The alkoxysilanes (B1) and (B2) are preferably added in excess to the HO-terminated organopolysiloxanes (A) in terms of the stoichiometric ratios. In order to permit the reaction of the HO-terminated organopolysiloxanes (A) with alkoxysilanes (B1) and (B2) to proceed as far as possible toward completion, use is preferably made of from 10 to 60 parts by weight, in particular from 20 to 50 parts by weight, of the alkoxysilanes (B1) and (B2) per 500 parts by weight of the HO-terminated organopolysiloxanes (A). The excess of alkoxysilanes (B1) and (B2) not consumed during the reaction is not disadvantageous in the organyloxy-terminated organopolysiloxane and in the alkoxy RTV-1 compositions, and may therefore remain in the product of the reaction. An excess of alkoxysilanes (B1) acts as a crosslinking component in the alkoxy RTV-1 compositions.

The reaction preferably takes place at temperatures of from 20° C. to 50° C., in particular at room temperature. Depending on the alkoxysilanes (B1) and (B2) used, the reaction time is generally from 1 to 60 minutes. The rate of the reaction depends firstly, on the reactivity of the alkoxysilanes (B1) and (B2), and secondly, on the acid phosphoric ester (C). At room temperature the particularly preferred duration of the reaction is from 3 to 20 min, and this is specifically a substantial advantage for preparing RTV-1 compositions by the one-pot process.

In addition to the abovementioned components, the alkoxy RTV-1 compositions may comprise other components known per se.

Other substances which may preferably be added when preparing the alkoxy RTV-1 compositions include bis (trialkoxysilyl)-$C_1$–$C_{12}$ alkanes in which the alkoxy radicals are $OR^6$, for example bis(triethoxysilyl)ethane.

In preparing the alkoxy RTV-1 compositions use may also be made of condensation catalysts, reinforcing fillers, non-reinforcing fillers, pigments, soluble dyes, fragrances, plasticizers, phosphoric esters or dimethylpolysiloxanes end-capped by trimethylsiloxy groups and liquid at room temperature, fungicides, resin-like organopolysiloxanes, including those composed of $(CH_3)_3SiO_{1/2}$ units and $SiO_{4/2}$ units, purely organic resins, such as homo- or copolymers of acrylonitrile, of styrene, of vinyl chloride or of propylene, where purely organic resins of this type, in particular copolymers of styrene and n-butyl acrylate, may have been produced by free-radical polymerization of the monomers mentioned in the presence of diorganopolysiloxanes having an Si-bonded hydroxyl group in each terminal unit, corrosion inhibitors, polyglycols, which may have been esterified and/or etherified, oxidation retarders, heat stabilizers, solvents, agents to affect the electrical properties, such as conductive carbon black, flame retardants, light stabilizers and agents to prolong skin-formation time, such as silanes having SiC-bonded mercaptoalkyl radicals, and also blowing agents, e.g. azodicarbonamide. Other substances which may be added are adhesion promoters, preferably aminoalkylfunctional silanes, such as γ-aminopropyltriethoxysilane.

It is preferable to employ condensation catalysts. The alkoxy RTV-1 compositions may employ any conventional RTV-1 condensation catalysts, such as those which have been present hitherto in compositions which can be stored while water is excluded, and which crosslink when exposed to water at room temperature to give elastomers. Examples of condensation catalysts of this type are organic compounds of tin, zinc, zirconium, titanium or aluminum. Of these condensation catalysts, preference is given to butyl titanates and organic tin compounds, such as di-n-butyltin diacetate and di-n-butyltin dilaurate, and to products of the reaction of a diorganotin diacylate with a silane, each molecule of which has, as hydrolyzable groups, at least two monovalent hydrocarbon radicals which are bonded via oxygen to silicon and if desired have alkoxy substitution, or with oligomers of the same, where the tin atoms in the products of this reaction have all of their valences satisfied by oxygen atoms in the group $\equiv$SiOSn$\equiv$ and/or by SnC-bonded, monovalent organic radicals.

The alkoxy RTV-1 compositions preferably comprise fillers. Examples of fillers are nonreinforcing fillers, i.e., fillers with a BET surface area of up to 50 m$^2$/g, such as quartz, diatomaceous earth, calcium silicate, zirconium silicate, zeolites, metal oxide powders such as aluminum oxides, titanium oxides, iron oxides or zinc oxides and/or mixed oxides of these, barium sulfate, calcium carbonate, gypsum, silicon nitride, silicon carbide, boron nitride, powdered glass and powdered plastics such as powdered polyacrylonitrile; reinforcing fillers, i.e. fillers with a BET surface area of more than 50 m$^2$/g, such as pyrogenic silica, precipitated silica, carbon black, such as furnace black or acetylene black and silicon-aluminum mixed oxides of high BET surface area; and fibrous fillers such as asbestos and synthetic polymeric fibers.

The fillers mentioned may have been hydrophobicized, for example by treatment with organosilanes and/or -siloxanes or with stearic acid, or by etherifying hydroxyl groups to give alkoxy groups. It is possible to use one type of filler, or else a mixture of at least two fillers. If reinforcing silica is used as sole filler it is possible to prepare transparent alkoxy RTV-1 compositions.

The usual moisture present in the air is sufficient to crosslink the alkoxy RTV-1 compositions. If desired, it is also possible for the crosslinking to be carried out at temperatures below or above room temperature, e.g., at from −5° C. to 10° C., or at from 30° C. to 50° C.

The stress at 100% strain (100% modulus) in accordance with DIN 18540 of the cured alkoxy RTV-1 compositions is preferably not more than 0.45 N/mm$^2$, in particular not more than 0.4 N/mm$^2$. The novel alkoxy RTV-1 compositions therefore have excellent suitability as, for example, compositions for sealing joints, including joints which run vertically, or for sealing spaces having for example, clear width from 10 to 40 mm, e.g. in buildings, land vehicles, watercraft or aircraft, or as adhesives or putties, e.g. in the construction of windows or the production of display cabinets, and also, for example, for the production of protective coatings, or of elastomeric moldings, or for the insulation of electrical or electronic equipment. The novel alkoxy RTV-1 compositions are in particular suitable as sealing compounds for filling joints in natural stone.

In the examples described below, all data on percentage parts are based on weight unless otherwise stated. All viscosity data moreover are based on a temperature of 25° C. Unless otherwise stated the examples below are carried out at ambient atmospheric pressure, i.e. at about 1000 hPa, and at room temperature, i.e., at about 20° C., or at a temperature which results when the reactants are brought together at room temperature without additional heating or cooling.

EXAMPLES

The examples of preparation are described below. The alkoxy-end-capping is carried out either with blends of trialkoxy- and dialkoxysilanes (B1) and (B2) or, for comparative purposes, with trialkoxysilanes (B1) alone (Examples 4 and 5). Again for comparative purposes, a silicone plasticizer is admixed in some examples (Examples 6 and 7). Values are given for the following properties:

1) Skin-formation time, initial value.
2) Skin-formation time, after 28 days of tube storage at 50° C.
3) Stress at 100% strain (100% modulus), measured in accordance with DIN 18540.

The test specimens are produced as follows:

A joint cavity of dimensions 50×12×12 mm is produced between two U-shaped aluminum sections (wall thickness: 2 mm; length: 70 mm; width: 12 mm; height: 12 mm), using two outer elements for spacing and delimiting the joint (length: 10 mm; width 12 mm; height 12 mm).* After 4 weeks' storage at 23° C./50% RH the stress is measured at a strain of 100%.

*To ensure adhesion, the aluminium sections are treated with a primer.

4) Determination of plasticizer migration.

A joint cavity of dimensions 80×8×10 mm joint width is produced between two sections made from altoquartzite with dimensions of 80 mm in length and the same in width, and 8 mm in height. After 2 weeks' storage at 23° C./50% RH the test specimen is compressed in clamping equipment perpendicularly to the joint, so that the joint width is reduced from initially 10 nmm to 7.5 mm. The specimen is stored at 50° C. under this stress and is tested after a storage time of 6 weeks to determine whether any dark coloration of the stone surface can be detected around the border of the joint.

Example 1 (inventive)

850 g of a dimethylpolysiloxane which has a hydroxyl group in each terminal unit and has a viscosity of 20,000 mPa·s at 23° C. are mixed, in a planetary mixer which can operate under vacuum, with 12 g of a mixture of alkoxylated phosphoric esters of the formulae $(OH)_1PO[(OCH_2CH_2)_{2-3}-O-(CH_2)_{7-9}-CH_3]_2$ and $(OH)_2PO[(OCH_2CH_2)_{2-3}-O-(CH_2)_{7-9}-CH_3]_1$.

20 g of methyltrimethoxysilane, 10 g of vinyltrimethoxysilane and 10 g of dimethyldimethoxysilane are then immediately added, followed by homogenization at room temperature under normal pressure for 10 minutes. The following are then added in the sequence given, using the mixing techniques usual for RTV-1 compositions:

85 g of pyrogenic, hydrophilic silica with a BET surface area of 150 m$^2$/g, 18 g of amino-functional siloxane which is the equilibration product made from aminopropyltriethoxysilane and a condensate/hydrolysate of methyltriethoxysilane with an amine number of 2.2, 4 g of 3-(2-aminoethylamino)propyltriethoxysilane, and 4 g of a reaction product prepared by heating a mixture of 4 parts of tetraethyl silicate and 2.2 parts of di-n-butyltin diacetate for 6 hours at 120° C. at ambient atmospheric pressure, with stirring, and at the same time distilling off the ethyl acetate produced in the reaction. After homogenization in vacuo, the compound is drawn off into moisture-proof packs.

The skin-formation time of the composition during vulcanization has an initial value of 20 minutes. This value remains unchanged even after 28 d/50° C. The modulus at 100% strain of the composition of the example in a bond produced and cured as in 3) is measured as 0.50. The periphery of a joint produced between altoquartzite plaques as in 4) shows no soiling of any type after 6 weeks at 50° C.

Example 2 (inventive)

The procedure is similar to that of Example 1. 850 g of the α,ω-dihydroxypolydimethylsiloxane of Example 1 are mixed with 15 g of a mixture of alkoxylated phosphoric esters of the formulae

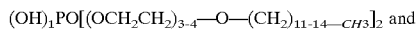

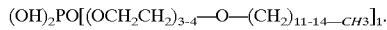

To this the following ingredients are added in the sequence given:

22 g of methyltrimethoxysilane, 11 g of vinyltrimethoxysilane, 17 g of dimethyldimethoxysilane, 18 g of amino-functional siloxane which is the equilibration product made from aminopropyltriethoxysilane and a condensate/hydrolysate of methyltriethoxysilane with an amine number of 2.2, 4 g of 3-(2-aminoethylamino) propyltriethoxysilane, 85 g of pyrogenic, hydrophilic silica with a BET surface area of 150 m$^2$/g, and 4 g of the reaction product of tetraethyl silicate and di-n-butyltin diacetate from Example 1.

The skin-formation time of the composition during vulcanization has an initial value of 30 minutes. This value remains unchanged even after 28 d/50° C. The modulus at 100% strain of the composition in a bond produced and cured as in 3) is measured as 0.35. The periphery of a joint produced between altoquartzite plaques as in 4) shows no soiling of any type after 6 weeks at 50° C.

Example 3

The procedure is similar to that of Example 1. The following ingredients are admixed in the sequence given, employing 850 g of the α,ω-dihydroxypolydimethylsiloxane of Example 1: 15 g of the alkoxylated phosphoric ester of Example 2, 17 g of methyltrimethoxysilane, 8 g of vinyltrimethoxysilane and 25 g of dimethyldimethoxysilane are then added immediately, followed by homogenization in vacuo for 10 minutes. The following are then added in the sequence given, using the mixing techniques usual for RTV-1 compositions: 18 g of amino-functional siloxane which is the equilibration product made from aminopropyltriethoxysilane and a condensate/hydrolysate of methyltriethoxysilane with an amine number of 2.2, 4 g of 3-(2-aminoethylamino)propyltriethoxysilane, 85 g of pyrogenic, hydrophilic silica with a BET surface area of 150 m$^2$/g, and 4 g of the reaction product of tetraethyl silicate and di-n-butyltin diacetate from Example 1.

The skin-formation time of the composition during vulcanization has an initial value of 35 minutes. This value remains unchanged even after 28 d/50° C. The modulus at 100% strain of the composition in a bond produced and cured as in 3) is measured as 0.25. The periphery of a joint produced between altoquartzite plaques as in 4) shows no soiling of any type after 6 weeks at 50° C.

Example 4 (comparative example without modulus-reducing additive)

The procedure is similar to that of Example 1. The following ingredients are admixed in the sequence given, employing 850 g of the α,ω-dihydroxypolydimethylsiloxane of Example 1: 15 g of the alkoxylated phosphoric ester of Example 2, 33 g of methyltrimethoxysilane, 17 g of vinyltrimethoxysilane, 18 g of amino-functional siloxane which is the equilibration product made from aminopropyltriethoxysilane and a condensate/hydrolysate of methyltriethoxysilane with an amine number of 2.2, 4 g of 3-(2 aminoethylamino) propyltriethoxysilane, 85 g of pyrogenic, hydrophilic silica with a BET surface area of 150 m$^2$/g, and 4 g of the reaction product of tetraethyl silicate and di-n-butyltin diacetate from Example 1.

The skin-formation time of the composition during vulcanization has an initial value of 35 minutes. This value remains unchanged even after 28 d/50° C. The modulus at 100% strain of the composition in a bond produced and cured as in 3) could not be measured, since the cohesion of the composition breaks when the strain is 73%. The modulus at 50% strain is 0.56. The modulus of the composition is extremely high. The periphery of a joint produced between altoquartzite plaques as in 4) shows no soiling of any type after 6 weeks at 50° C.

Example 5 (comparative example without modulus-reducing additive, with a lower proportion of crosslinking agent and with a compounding sequence different from that of Example 4)

The procedure is similar to that of Example 1. The following ingredients are admixed in the sequence given, employing 850 g of the α,ω-dihydroxypolydimethylsiloxane of Example 1: 12 g of the alkoxylated phosphoric ester of Example 1, 20 g of methyltrimethoxysilane, 10 g of vinyltrimethoxysilane, 85 g of pyrogenic, hydrophilic silica with a BET surface area of 150 m$^2$/g, 18 g of amino-functional siloxane which is the equilibration product made from aminopropyltriethoxysilane and a condensate/hydrolysate of methyltriethoxysilane with an amine number of 2.2, 4 g of 3-(2 aminoethylamino) propyltriethoxysilane, and 4 g of the reaction product of tetraethyl silicate and di-n-butyltin diacetate from Example 1.

The skin-formation time of the composition during vulcanization has an initial value of 20 minutes. This value remains unchanged even after 28 d/50° C. The modulus at 100% strain of the composition in a bond produced and cured as in 3) is measured as 0.60. The periphery of a joint produced between altoquartzite plaques as in 4) shows no soiling of any type after 6 weeks at 50° C.

Example 6 (comparative example with external plasticizer)

The procedure is similar to that of Example 1. However, 607 g of the α,ω-dihydroxypolydimethylsiloxane of Example 1 are firstly mixed with 243 g of a polydimethylsiloxane having trimethylsiloxy groups in the terminal units, and having a viscosity of 100 mm²/s (23° C.). The following ingredients are then admixed in the sequence given: 8 g of the alkoxylated phosphoric ester of Example 2, 20 g of methyltrimethoxysilane, 10 g of vinyltrimethoxysilane, 18 g of amino-functional siloxane: equilibration product made from aminopropyltriethoxysilane and a condensate/hydrolysate of methyltriethoxysilane with an amine number of 2.2, 4 g of 3-(2-aminoethylamino)propyltriethoxysilane, 85 g of pyrogenic, hydrophilic silica with a BET surface area of 150 m²/g, and 4 g of the reaction product of tetraethyl silicate and di-n-butyltin diacetate from Example 1.

The skin-formation time of the composition during vulcanization has an initial value of 20 minutes. This value remains unchanged even after 28 d/50° C. The modulus at 100% strain of the composition in a bond produced and cured as in 3) is measured as 0.38. The periphery of a joint produced between altoquartzite plaques as in 4) shows severe soiling after 6 weeks at 50° C.

Example 7 (comparative example with external plasticizer)

The procedure is similar to that of Example 1. However, 535 g of the α,ω-dihydroxypolydimethylsiloxane of Example I are firstly mixed with 315 g of a polydimethylsiloxane having trimethylsiloxy groups in the terminal units, and having a viscosity of 100 mm²/s (23° C.). The following ingredients are then admixed in the sequence given: 8 g of the alkoxylated phosphoric ester of Example 2, 20 g of methyltrimethoxysilane, 10 g of vinyltrimethoxysilane, 18 g of amino-functional siloxane which is the equilibration product made from aminopropyltriethoxysilane and a condensate/hydrolysate of methyltriethoxysilane with an amine number of 2.2, 4 g of 3-(2-aminoethylamino)propyltriethoxysilane, 85 g of pyrogenic, hydrophilic silica with a BET surface area of 150 m²/g, and 4 g of the reaction product of tetraethyl silicate and di-n-butyltin diacetate from Example 1.

The skin-formation time of the composition during vulcanization has an initial value of 20 minutes. This value remains unchanged even after 28 d/50° C. The modulus at 100% strain of the composition in a bond produced and cured as in 3) is measured as 0.36. The periphery of a joint produced between altoquartzite plaques as in 4) shows very severe soiling, more pronounced than in Example 6, after 6 weeks at 50° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated otherwise.

What is claimed is:

1. An alkoxy RTV-1 composition comprising the product of the reaction of
   (A) an HO-terminated organopolysiloxane,
   (B1) an alkoxysilane which has at least three alkoxy groups and/or its partial hydrolysates, and
   (B2) an alkoxysilane which has two alkoxy groups and/or its partial hydrolysates, in the presence of
   (C) an acid phosphoric ester of the general formula (I)

$$(HO)_aOP(-O-[(CR^1_2)_b-O]_c[(CR^2_2)_d]_e-L-M)_{(3-a)} \qquad (I),$$

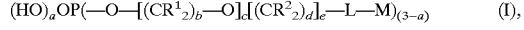

where
   a is 1 or 2,
   $R^1$ and $R^2$ are a hydrogen radical, methyl radical or hydroxyl radical,
   b and d are 2 or 3,
   c is an integer from 2 to 15,
   e is 0 or 1
   L is an —O—, —COO—, —OOC—, —CONR³—, —NR⁴CO— or —CO— radical,
   $R^3$ and $R^4$ are a hydrogen radical or $C_1$–$C_{10}$-alkyl radical, and
   M is a monovalent, unsubstituted or hydroxyl-, fluorine-, chlorine-, bromine-, $C_1$–$C_{10}$-alkoxyalkyl- or cyano-substituted $C_1$–$C_{20}$-hydrocarbon radical, with the proviso that on any single carbon atom, not more than one of radicals $R^1$ and $R^2$ is a hydroxyl radical.

2. An RTV-1 composition as claimed in claim 1, in which the weight ratio of the alkoxysilanes (B1):(B2) is from 99:1 to 0.5:1.

3. An RTV-1 composition as claimed in claim 1 in which the HO-terminated organopolysiloxane (A) is a linear α,ω-dihydroxypoly(diorgano)siloxane of the general formula (II)

$$HO-[R_2SiO]_m-H \qquad (II),$$

where
   R is a monovalent, unsubstituted or fluorine-, chlorine-, bromo-$C_1$–$C_4$-alkoxyalkyl- or cyano-substituted $C_1$–$C_8$-hydrocarbon radical, and
   m has a value which corresponds to a viscosity of the HO-terminated organopolysiloxane (A) of from 0.05 to 1000 Pa·s.

4. An RTV-1 composition as claimed in claim 2 in which the HO-terminated organopolysiloxane (A) is a linear α,ω-dihydroxypoly(diorgano)siloxane of the general formula (II)

$$HO-[R_2SiO]_m-H \qquad (II),$$

where
   R is a monovalent, unsubstituted or fluorine-, chlorine-, bromo-$C_1$–$C_4$-alkoxyalkyl- or cyano-substituted $C_1$–$C_8$-hydrocarbon radical, and
   m has a value which corresponds to a viscosity of the HO-terminated organopolysiloxane (A) of from 0.05 to 1000 Pa·s.

5. An RTV-1 composition as claimed in claim 1, in which the alkoxysilanes (B1) have the general formula (III)

$$R^5_\mu Si(OR^6)_{4-\mu} \qquad (III),$$

where
   $R^5$ and $R^6$ are monovalent, unsubstituted or fluorine-, chlorine-, bromine-, $C_1$–$C_4$-alkoxyalkyl- or cyano-substituted $C_1$–$C_{13}$-hydrocarbon radicals, and
   μ is 0 or 1.

6. An RTV-1 composition as claimed in claim 2, in which the alkoxysilanes (B1) have the general formula (III)

$$R^5_\mu Si(OR^6)_{4-\mu} \qquad (III),$$

where

R$^5$ and R$^6$ are monovalent, unsubstituted or fluorine-, chlorine-, bromine-, C$_1$–C$_4$-alkoxyalkyl- or cyano-substituted C$_1$–C$_{13}$-hydrocarbon radicals, and μ is 0 or 1.

7. An RTV-1 composition as claimed in claim 3, in which the alkoxysilanes (B1) have the general formula (III)

$$R^5{}_\mu Si(OR^6)_{4-\mu} \qquad (III),$$

where

R$^5$ and R$^6$ are monovalent, unsubstituted or fluorine-, chlorine-, bromine-, C$_1$–C$_4$-alkoxyalkyl- or cyano-substituted C$_1$–C$_{13}$-hydrocarbon radicals, and μ is 0 or 1.

8. An RTV-1 composition as claimed in claim 1, in which the alkoxysilanes (B2) have the general formula (IV)

$$R^7{}_2 Si(OR^8)_2 \qquad (IV),$$

where

R$^7$ and R$^8$ are monovalent, unsubstituted or fluorine-, chlorine-, bromine-, C$_1$–C$_4$-alkoxyalkyl- or cyano-substituted C$_1$–C$_{13}$-hydrocarbon radicals.

9. An RTV-1 composition as claimed in claim 2, in which the alkoxysilanes (B2) have the general formula (IV)

$$R^7{}_2 Si(OR^8)_2 \qquad (IV),$$

where

R$^7$ and R$^8$ are monovalent, unsubstituted or fluorine-, chlorine-, bromine-, C$_1$–C$_4$-alkoxyalkyl- or cyano-substituted C$_1$–C$_{13}$-hydrocarbon radicals.

10. An RTV-1 composition as claimed in claim 3, in which the alkoxysilanes (B2) have the general formula (IV)

$$R^7{}_2 Si(OR^8)_2 \qquad (IV),$$

where

R$^7$ and R$^8$ are monovalent, unsubstituted or fluorine-, chlorine-, bromine-, C$_1$–C$_4$-alkoxyalkyl- or cyano-substituted C$_1$–C$_{13}$-hydrocarbon radicals.

11. An RTV-1 composition as claimed in claim 5, in which the alkoxysilanes (B2) have the general formula (IV)

$$R^7{}_2 Si(OR^8)_2 \qquad (IV),$$

where

R$^7$ and R$^8$ are monovalent, unsubstituted or fluorine-, chlorine-, bromine-, C$_1$–C$_4$-alkoxyalkyl- or cyano-substituted C$_1$–C$_{13}$-hydrocarbon radicals.

12. The alkoxy RTV-1 composition of claim 1 which following curing has a modulus at 100% strain of 0.45 N/mm$^2$ or less.

13. A process for preparing the alkoxy RTV-1 composition as claimed in claim 1, in which (A) an HO-terminated organopolysiloxane, (B1) an alkoxysilane which has at least three alkoxy groups and/or its partial hydrolysates, and (B2) an alkoxysilane which has two alkoxy groups and/or its partial hydrolysates are reacted in the presence of (C) an acid phosphoric ester of the general formula (I).

14. In a process for filling joints in natural stone wherein an RTV-1 organosilicon composition is employed, the improvement comprising selecting as said RTV-1 organosilicon composition the alkoxy RTV-1 composition of claim 1.

* * * * *